US011821735B2

(12) United States Patent
Voronel et al.

(10) Patent No.: US 11,821,735 B2
(45) Date of Patent: Nov. 21, 2023

(54) PROACTIVE DELIVERY OF NAVIGATION OPTIONS

(71) Applicant: Uber Technologies, Inc., San Francisco, CA (US)

(72) Inventors: Gary Voronel, Seattle, WA (US); Donald Barnett, Monroe, WA (US); Timothy Wantland, Bellevue, WA (US); Ran Mokady, Kirkland, WA (US); Amid Moradganjeh, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

(21) Appl. No.: 17/660,539

(22) Filed: Apr. 25, 2022

(65) Prior Publication Data

US 2022/0252407 A1    Aug. 11, 2022

Related U.S. Application Data

(63) Continuation of application No. 16/451,937, filed on Jun. 25, 2019, now Pat. No. 11,320,274, which is a
(Continued)

(51) Int. Cl.
*G01C 21/34* (2006.01)
*H04W 4/21* (2018.01)
(Continued)

(52) U.S. Cl.
CPC ......... *G01C 21/3407* (2013.01); *G01C 21/34* (2013.01); *G01C 21/36* (2013.01);
(Continued)

(58) Field of Classification Search
CPC .... G01C 21/3407; G01C 21/34; G01C 21/36; H04W 4/024; H04W 4/21
(Continued)

(56) References Cited

U.S. PATENT DOCUMENTS 6,035,253 A    3/2000  Hayashi et al.
6,112,153 A    8/2000  Schaaf et al.
(Continued)

FOREIGN PATENT DOCUMENTS

EP     1739393 A1    1/2007
EP     2221582 A2    8/2010
(Continued)

OTHER PUBLICATIONS

"U.S. Appl. No. 13/534,022, Final Office Action dated Apr. 9, 2015", 6 pgs.
(Continued)

*Primary Examiner* — Tuan C To
(74) *Attorney, Agent, or Firm* — SCHWEGMAN LUNDBERG & WOESSNER, P.A.

(57) ABSTRACT

Various embodiments pertain to techniques for proactively delivering navigation options to a user via a mobile device. In various embodiments, one or more navigation options can be determined for the user and delivered to the user's mobile device at a relevant time. Navigation options can be selected based on the user's current location, the user's future plans, the time, and other locally relevant information, such as friends nearby or a nearby favorite location of the user. The navigation options can be delivered to the user's mobile device at a time that the navigation options are relevant.

17 Claims, 4 Drawing Sheets

Related U.S. Application Data continuation of application No. 14/981,891, filed on Dec. 28, 2015, now Pat. No. 10,365,114, which is a continuation of application No. 13/534,022, filed on Jun. 27, 2012, now Pat. No. 9,222,788.

(51) Int. Cl.
  *H04W 4/024* (2018.01)
  *G01C 21/36* (2006.01)
  *H04W 4/02* (2018.01)

(52) U.S. Cl.
  CPC ............. *H04W 4/024* (2018.02); *H04W 4/21* (2018.02); *H04W 4/02* (2013.01)

(58) Field of Classification Search
  USPC ....................................................... 701/526
  See application file for complete search history.

(56) References Cited

U.S. PATENT DOCUMENTS

| | | |
|---|---|---|
| 6,266,614 B1 | 7/2001 | Alumbaugh |
| 6,339,744 B1 | 1/2002 | Hancock et al. |
| 6,591,263 B1 | 7/2003 | Becker et al. |
| 7,272,377 B2 | 9/2007 | Cox et al. |
| 7,454,608 B2 | 11/2008 | Gopalakrishnan et al. |
| 7,487,112 B2* | 2/2009 | Barnes, Jr. .............. H04L 67/52 709/204 |
| 7,571,050 B2 | 8/2009 | Liebling |
| 7,743,056 B2 | 6/2010 | Meisels et al. |
| 7,779,166 B2* | 8/2010 | Grant ................ H04M 1/72427 715/702 |
| 7,920,963 B2 | 4/2011 | Jouline et al. |
| 8,082,097 B2 | 12/2011 | Hilliar Isaacson |
| 8,364,392 B2 | 1/2013 | Chao |
| 8,972,171 B1 | 3/2015 | Barth |
| 9,222,788 B2 | 12/2015 | Voronel et al. |
| 9,234,762 B2 | 1/2016 | Meisels et al. |
| 9,792,368 B1 | 10/2017 | Amacker et al. |
| 10,365,114 B2 | 7/2019 | Voronel et al. |
| 2002/0183924 A1 | 12/2002 | Yokota |
| 2003/0018714 A1 | 1/2003 | Mikhailov et al. |
| 2003/0064716 A1 | 4/2003 | Gailey et al. |
| 2003/0158650 A1 | 8/2003 | Abe et al. |
| 2003/0158657 A1 | 8/2003 | Agnew et al. |
| 2004/0132465 A1 | 7/2004 | Mattila et al. |
| 2005/0068169 A1* | 3/2005 | Copley ................ G08B 29/046 340/568.1 |
| 2005/0096840 A1 | 5/2005 | Simske |
| 2005/0218206 A1 | 10/2005 | Ohno et al. |
| 2005/0250516 A1* | 11/2005 | Shim ........................ H04W 8/18 455/456.6 |
| 2006/0123053 A1* | 6/2006 | Scannell ............ G06F 16/9577 |
| 2007/0005188 A1 | 1/2007 | Johnson |
| 2007/0060108 A1 | 3/2007 | East et al. |
| 2007/0061071 A1 | 3/2007 | Torii |
| 2008/0014908 A1* | 1/2008 | Vasant .................. H04L 67/306 455/414.1 |
| 2008/0021697 A1 | 1/2008 | Cox et al. |
| 2008/0033639 A1 | 2/2008 | Nakamura et al. |
| 2008/0086455 A1 | 4/2008 | Meisels et al. |
| 2008/0132241 A1 | 6/2008 | Hancock et al. |
| 2008/0169920 A1 | 7/2008 | Spence |
| 2008/0195428 A1* | 8/2008 | O'Sullivan ............ G06Q 50/30 705/6 |
| 2009/0005061 A1* | 1/2009 | Ward ........................ H04W 8/08 455/566 |
| 2009/0024313 A1 | 1/2009 | Hahn |
| 2009/0030885 A1* | 1/2009 | DePasquale ........... G06Q 20/12 |
| 2009/0036148 A1 | 2/2009 | Yach |
| 2009/0049388 A1 | 2/2009 | Taib et al. |
| 2009/0112462 A1 | 4/2009 | Lo |
| 2009/0149163 A1* | 6/2009 | Chrumka ............ H04M 3/4872 455/414.1 |
| 2009/0164111 A1 | 6/2009 | Hosoi et al. |
| 2009/0192702 A1 | 7/2009 | Bourne |
| 2009/0199122 A1 | 8/2009 | Deutsch et al. |
| 2010/0017108 A1 | 1/2010 | Nakamura et al. |
| 2010/0088023 A1* | 4/2010 | Werner ..................... G09B 5/02 455/566 |
| 2010/0088026 A1* | 4/2010 | Manolescu ............... G08G 1/20 701/469 |
| 2010/0121566 A1 | 5/2010 | Joshi et al. |
| 2010/0153004 A1 | 6/2010 | Natsume |
| 2010/0183134 A1 | 7/2010 | Vendrow et al. |
| 2010/0268460 A1 | 10/2010 | Wan et al. |
| 2010/0332668 A1 | 12/2010 | Shah et al. |
| 2011/0090078 A1* | 4/2011 | Kim ..................... G06Q 10/109 340/522 |
| 2011/0106423 A1 | 5/2011 | Morley |
| 2011/0106433 A1 | 5/2011 | Otani |
| 2011/0137548 A1 | 6/2011 | Shen et al. |
| 2011/0238647 A1 | 9/2011 | Ingram et al. |
| 2012/0004841 A1 | 1/2012 | Schunder |
| 2012/0022788 A1 | 1/2012 | Yamamoto |
| 2012/0041675 A1* | 2/2012 | Juliver ................... G06Q 10/08 701/465 |
| 2012/0131212 A1 | 5/2012 | Tang et al. |
| 2012/0215641 A1 | 8/2012 | Ohki |
| 2012/0290652 A1* | 11/2012 | Boskovic ............... G06Q 10/02 709/204 |
| 2012/0297041 A1 | 11/2012 | Momchilov |
| 2012/0303262 A1 | 11/2012 | Alam et al. |
| 2012/0303274 A1 | 11/2012 | Su et al. |
| 2013/0130709 A1* | 5/2013 | Voronel ............... G01C 21/3476 455/456.1 |
| 2013/0131986 A1 | 5/2013 | Van Seggelen et al. |
| 2013/0166096 A1 | 6/2013 | Jotanovic |
| 2013/0325320 A1 | 12/2013 | Dimitriadis |
| 2014/0005921 A1 | 1/2014 | Voronel et al. |
| 2014/0358427 A1 | 12/2014 | Fuhrman |
| 2015/0370903 A1* | 12/2015 | Schuller ............... G06F 16/9537 707/722 |
| 2016/0146620 A1 | 5/2016 | Voronel et al. |
| 2019/0316918 A1 | 10/2019 | Voronel et al. |

FOREIGN PATENT DOCUMENTS

| | | | |
|---|---|---|---|
| JP | 1123716 A | 1/1999 | |
| JP | 2004212146 A | 7/2004 | |
| JP | 2010165023 A | 7/2010 | |
| JP | 2011149786 A | 8/2011 | |
| WO | WO-2008011432 A2 * | 1/2008 | ............. G08G 1/005 |
| WO | WO-2011085133 A1 * | 7/2011 | ........... G01C 21/165 |
| WO | WO-2011110730 A1 * | 9/2011 | ......... G01C 21/3614 |
| WO | WO-2012070379 A1 | 5/2012 | |

OTHER PUBLICATIONS

"U.S. Appl. No. 13/534,022, Final Office Action dated Jul. 2, 2014", 13 pgs.

"U.S. Appl. No. 13/534,022, Non Final Office Action dated Mar. 20, 2014", 12 pgs.

"U.S. Appl. No. 13/534,022, Non Final Office Action dated Dec. 5, 2014", 6 pgs.

"U.S. Appl. No. 13/534,022, Notice of Allowance dated Aug. 18, 2015", 9 pgs.

"U.S. Appl. No. 13/534,022, Response filed Mar. 10, 2015 to Non Final Office Action dated Dec. 5, 2014", 14 pgs.

"U.S. Appl. No. 13/534,022, Response filed Apr. 30, 2014 to Non Final Office Action dated Mar. 20, 2014", 14 pgs.

"U.S. Appl. No. 13/534,022, Response filed Jun. 16, 2015 to Final Office Action dated Apr. 9, 2015", 14 pgs.

"U.S. Appl. No. 13/534,022, Response filed Aug. 28, 2014 to Final Office Action dated Jul. 2, 2014", 18 pgs.

"U.S. Appl. No. 14/981,891, Final Office Action dated Jan. 11, 2019", 7 pgs.

"U.S. Appl. No. 14/981,891, Final Office Action dated Feb. 26, 2018", 12 pgs.

(56) References Cited

OTHER PUBLICATIONS

"U.S. Appl. No. 14/981,891, Final Office Action dated Jul. 27, 2017", 10 pgs.

"U.S. Appl. No. 14/981,891, Non Final Office Action dated Mar. 9, 2017", 9 pgs.

"U.S. Appl. No. 14/981,891, Non Final Office Action dated Jun. 29, 2018", 10 pgs.

"U.S. Appl. No. 14/981,891, Non Final Office Action dated Oct. 19, 2017", 10 pgs.

"U.S. Appl. No. 14/981,891, Notice of Allowance dated Mar. 20, 2019", 6 pgs.

"U.S. Appl. No. 14/981,891, Response filed Feb. 25, 2019 to Final Office Action dated Jan. 11, 2019", 9 pgs.

"U.S. Appl. No. 14/981,891, Response filed May 18, 2017 to Non Final Office Action dated Mar. 9, 2017", 13 pgs.

"U.S. Appl. No. 14/981,891, Response filed May 25, 2018 to Final Office Action dated Feb. 26, 2018", 11 pgs.

"U.S. Appl. No. 14/981,891, Response filed Sep. 29, 2017 to Final Office Action dated Jul. 27, 2017", 19 pgs.

"U.S. Appl. No. 14/981,891, Response filed Oct. 1, 2018 to Non-Final Office Action dated Jun. 29, 2018", 10 pgs.

"U.S. Appl. No. 14/981,891, Response filed Nov. 30, 2017 to Non Final Office Action dated Oct. 19, 2017", 19 pgs.

"U.S. Appl. No. 16/451,937, Non Final Office Action dated Jun. 15, 2021", 18 pgs.

"U.S. Appl. No. 16/451,937, Notice of Allowance dated Jan. 5, 2022", 10 pgs.

"U.S. Appl. No. 16/451,937, Response filed Nov. 11, 2021 to Non Final Office Action dated Jun. 15, 2021", 12 pgs.

"U.S. Appl. No. 16/451,937, Supplemental Preliminary Amendment filed", 7 pgs.

Amiscis, et al., "Development of an Open Framework to Provide Intelligent Multi-modal Mobility Services", In Real Corp, (May 18, 2011), 10 pgs.

Chia-Chang, et al., "A Geographic Scheme with Location Update for Ad Hoc Routing", IEEE, (2009).

Dung, et al., "TDplanner: Public Transport Planning System with Real-Time Route Updates Based on Service Delays and Location Tracking", IEEE, (2011).

Kaasinen, Eija, "User Needs for Location-Aware Mobile Services", In Journal of Personal and Ubiquitous Computing, vol. 7, Issue 1, (May 2003), 70-79.

* cited by examiner

PROACTIVE DELIVERY OF NAVIGATION OPTIONS

CROSS-REFERENCE TO RELATED APPLICATION

This application is a continuation of U.S. Ser. No. 16/451,937, filed Jun. 25, 2019, which is a continuation of U.S. Ser. No. 14/981,891, filed Dec. 28, 2015, and which issued on Jul. 30, 2019 as U.S. Pat. No. 10,365,114, which is a continuation of a prior application entitled "Proactive Delivery of Navigation Options", which was assigned Ser. No. 13/534,022 and filed Jun. 27, 2012, and which issued on Dec. 29, 2015 as U.S. Pat. No. 9,222,788, the benefit of priority of each of which is hereby claimed herein, and which applications are hereby incorporated herein by reference in their entireties.

BACKGROUND

Typically, a user can request navigation instructions from a mobile device by providing a target destination and information regarding the user's current location to the mobile device. However, because the navigation instructions are delivered responsive to a user's input, the instructions may not include navigation options that the user did not consider.

Requesting navigation instructions can be tedious and repetitive for a user. The user has to indicate that home, or some other relevant location associated with the user, is the target destination (e.g., by selecting "home" or entering the user's home address), despite the fact that the user returns to the same location nearly every night. In the event that the user's plans deviate from the originally input information, the user must go through the process of inputting the information again. For instance, if a user is on a bus that is running late, such that the user will miss a connection to another bus line, the user will have to request new navigation instructions from the system upon arriving at the missed connection. The repetitive nature of requesting navigation instructions can cause a user to stop using the navigation instructions or to take a route to the target destination that is unduly long or out of the way because the user was not aware of other, better, alternative routes.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments pertain to techniques for proactively delivering navigation options to a user via a mobile device. In various embodiments, one or more navigation options can be determined for the user and delivered to the user's mobile device at a relevant time. Navigation options can be selected based on the user's current location, the user's future plans, the time, and other locally relevant information, such as friends nearby or a nearby favorite location of the user. The navigation options can be delivered to the user's mobile device at a time that the navigation options are most relevant. For example, assume that a particular navigation option includes catching a city bus that is scheduled to be at a stop closest to the user in five minutes. The navigation option will be delivered to the user such that the user has sufficient time to make it to the bus stop. If, however, the user does not catch the bus or is delayed on the way to the bus stop, that particular navigation option will be removed as an option and one or more alternative options will be sent to the user's mobile device.

BRIEF DESCRIPTION OF THE DRAWINGS

While the specification concludes with claims particularly pointing out and distinctly claiming the subject matter, it is believed that the embodiments will be better understood from the following description in conjunction with the accompanying figures, in which.

DETAILED DESCRIPTION

Overview

Various embodiments pertain to techniques for proactively delivering navigation options to a user via a mobile device. In various embodiments, one or more navigation options can be determined for the user and delivered to the user's mobile device at a relevant time. Navigation options can be selected based on the user's current location, the user's future plans, the time, and other locally relevant information, such as friends nearby or a nearby favorite location of the user. The navigation options can be delivered to the user's mobile device at a time that the navigation options are most relevant. For example, assume that a particular navigation option includes catching a city bus that is scheduled to be at a stop closest to the user in five minutes. The navigation option will be delivered to the user such that the user has sufficient time to make it to the bus stop. If, however, the user does not catch the bus or is delayed on the way to the bus stop, that particular navigation option will be removed as an option and one or more alternative options will be sent to the user's mobile device.

In the discussion that follows, a section entitled "Example Operating Environment" describes an operating environment in accordance with one or more embodiments. Next, a section entitled "Example Embodiments" describes various embodiments in which navigation options are proactively delivered to a user's mobile device. Finally, a section entitled "Example Device" describes an example device that can be used to implement one or more embodiments.

Consider, now, an example operating environment in accordance with one or more embodiments.

Example Operating Environment

Figure 1:
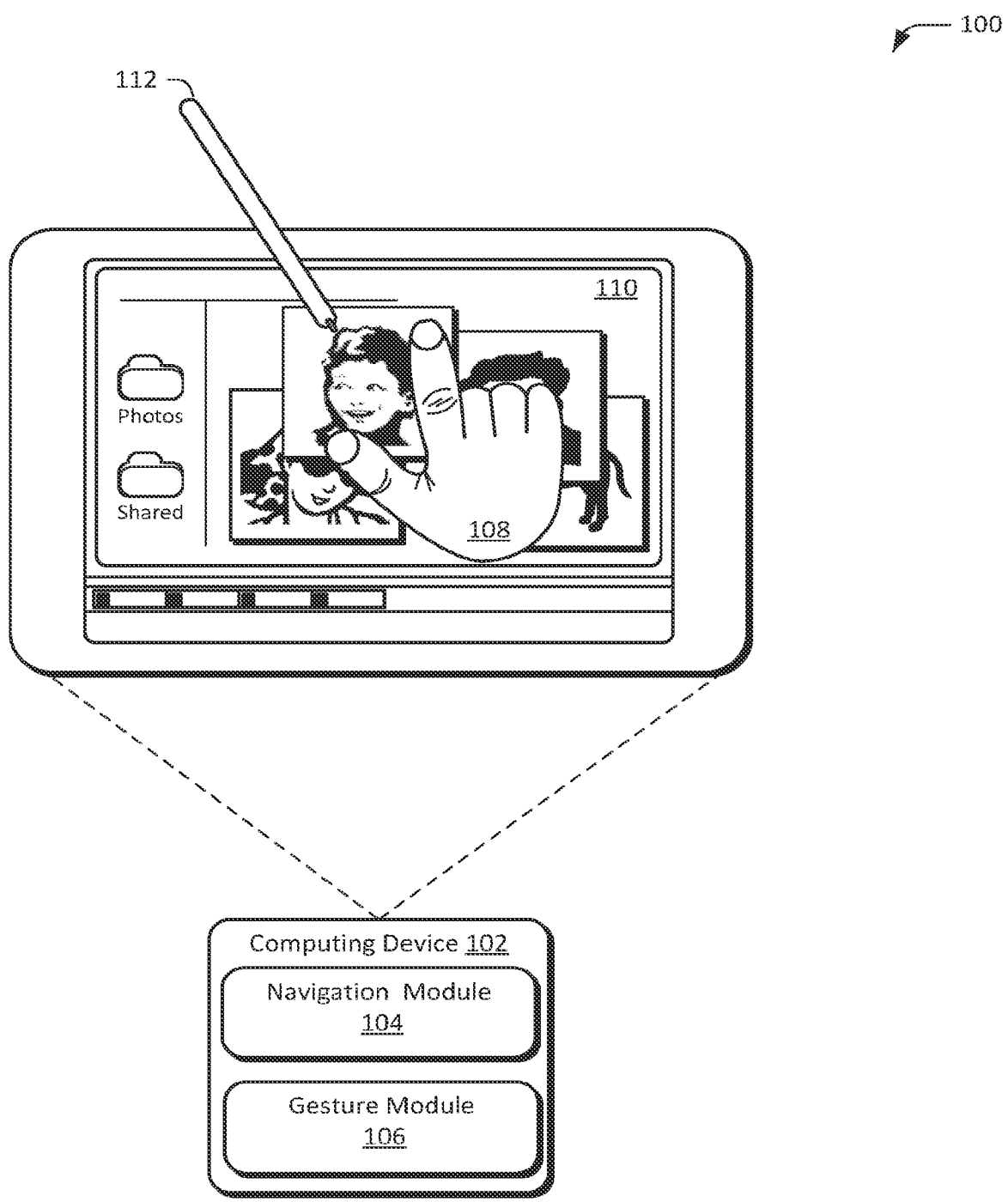
FIG. 1 is an illustration of an environment in an example implementation in accordance with one or more embodiments.

FIG. 1 is an illustration of an environment 100 in an example implementation that is operable to employ the animation techniques described in this document. The illustrated environment 100 includes an example of a computing device 102 that may be configured in a variety of ways. For example, the computing device 102 may be configured as a traditional computer (e.g., a desktop personal computer, laptop computer, and so on), a mobile station, an entertainment appliance, a set-top box communicatively coupled to a television, a wireless phone, a netbook, a game console, a handheld device, and so forth as further described in relation to FIG. 2. Thus, the computing device 102 may range from full resource devices with substantial memory and processor resources (e.g., personal computers, game consoles) to a low-resource device with limited memory and/or processing resources (e.g., traditional set-top boxes, handheld game consoles). The computing device 102 also includes software that causes the computing device 102 to perform one or more operations as described below.

Computing device 102 includes a navigation module 104 which can include a suitably configured geo-location device, such as a global positioning device, to enable navigation options to be determined for a user. For example, navigation module 104 can determine a user's current location and the user's target location and determine one or more navigation options suitable to get the user from the current location to the target location. In various embodiments, the navigation module 104 is configured to receive locally relevant information from third party sources, such as a social network, tolling information, taxi information, traffic information, or other executable modules on the mobile device, and incorporate at least some of the received information into the navigation options. For example, the navigation module can receive information that a user's friend is nearby and can suggest that the user carpool with the friend to the target destination. As another example, the navigation module can determine, based on information in a user's calendar, that the user has an event at a particular location and can provide navigation options to the meeting location to the user.

In various embodiments, navigation module 104 is configured to build a database or repository of locations visited by a user (e.g., save the location coordinates to a database or other form of memory). The repository or database of locations can be utilized by navigation module 104 to suggest or presume a target destination for a user based on a user's frequency of visits to the location, the user's location, or the user's calendar, for example.

Navigation module 104 is representative of functionality that enables delivery of navigation options on an automatic basis (e.g., without action by the user) with updated or new navigation options. As used herein, proactive delivery of navigation options explicitly excludes providing navigation options in response to receiving a user's request for navigation options, but can include providing navigation options responsive to a user activating the navigation module or opening a user interface associated with the navigation module. In various embodiments, proactive delivery of navigation options includes providing one or more alerts to a user regarding navigation without a user's explicit request for such an alert or updating navigation options without the user requesting an update to the navigation options. For example, assume that a user is out on the town. Navigation module 104 can determine one or more options that a user may choose to get home at the end of the night (e.g., walk, drive, take a cab, get a ride with a friend the user is out with, take the bus, etc.). At any point, the user can check the various options to get home, which can be automatically updated as the options change. For example, if the user's friend stays behind at one location while the user moves to a new location, the option to get a ride with the friend may be removed from the available options. Similarly, when the last bus for the night going by the user's house has run, the option to take the bus may be removed from the available options.

Accordingly, the navigation module provides a means various navigation options to be presented to a user to enable the user to make an educated decision about getting to the target destination.

Computing device 102 also includes a gesture module 106 that recognizes gestures that can be performed by one or more fingers, and causes operations to be performed that correspond to the gestures. The gestures may be recognized by gesture module 106 in a variety of different ways. For example, the gesture module 106 may be configured to recognize a touch input, such as a finger of a user's hand 108 as proximal to display device 110 of the computing device 102 using touchscreen functionality. Gesture module 106 can be utilized to recognize single-finger gestures and bezel gestures, multiple-finger/same-hand gestures and bezel gestures, and/or multiple-finger/different-hand gestures and bezel gestures.

The computing device 102 may also be configured to detect and differentiate between a touch input (e.g., provided by one or more fingers of the user's hand 108) and a stylus input (e.g., provided by a stylus 112). The differentiation may be performed in a variety of ways, such as by detecting an amount of the display device 110 that is contacted by the finger of the user's hand 108 versus an amount of the display device 110 that is contacted by the stylus 112.

Thus, the gesture module 106 may support a variety of different gesture techniques through recognition and leverage of a division between stylus and touch inputs, as well as different types of touch inputs.

Figure 2:
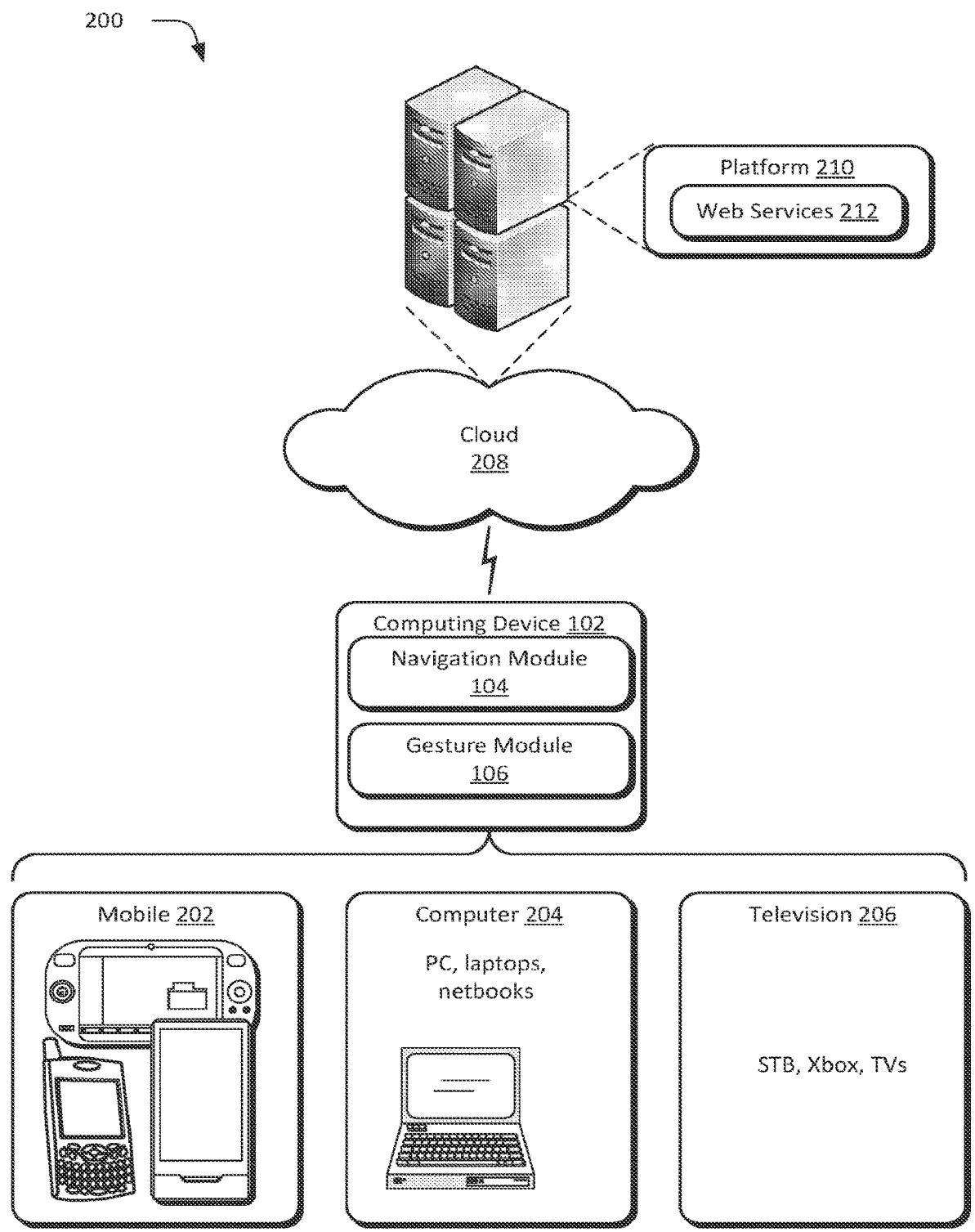
FIG. 2 is an illustration of a system in an example implementation showing FIG. 1 in greater detail in accordance with one or more embodiments.

FIG. 2 illustrates an example system 200 showing the navigation module 104 and gesture module 106 as being implemented in an environment where multiple devices are interconnected through a central computing device. The central computing device may be local to the multiple devices or may be located remotely from the multiple devices. In one embodiment, the central computing device is a "cloud" server farm, which comprises one or more server computers that are connected to the multiple devices through a network or the Internet or other means.

In one embodiment, this interconnection architecture enables functionality to be delivered across multiple devices to provide a common and seamless experience to the user of the multiple devices. Each of the multiple devices may have different physical requirements and capabilities, and the central computing device uses a platform to enable the delivery of an experience to the device that is both tailored to the device and yet common to all devices. In one embodiment, a "class" of target device is created and experiences are tailored to the generic class of devices. A class of device may be defined by physical features or usage or other common characteristics of the devices. For example, as previously described, the computing device 102 may be configured in a variety of different ways, such as for mobile 202, computer 204, and television 206 uses. Each of these configurations has a generally corresponding screen size and thus the computing device 102 may be configured as one of these device classes in this example system 200. For instance, the computing device 102 may assume the mobile 202 class of device which includes mobile telephones, music players, game devices, and so on. The computing device 102 may also assume a computer 204 class of device that includes personal computers, laptop computers, netbooks, and so on. The television 206 configuration includes configurations of device that involve display in a casual environment, e.g., televisions, set-top boxes, game consoles, and so on. Thus, the techniques described herein may be supported by these various configurations of the computing device 102 and are not limited to the specific examples described in the following sections.

Cloud 208 is illustrated as including a platform 210 for web services 212. The platform 210 abstracts underlying functionality of hardware (e.g., servers) and software resources of the cloud 208 and thus may act as a "cloud operating system." For example, the platform 210 may abstract resources to connect the computing device 102 with other computing devices. The platform 210 may also serve to abstract scaling of resources to provide a corresponding level of scale to encountered demand for the web services 212 that are implemented via the platform 210. A variety of other examples are also contemplated, such as load balancing of servers in a server farm, protection against malicious parties (e.g., spam, viruses, and other malware), and so on.

Thus, the cloud 208 is included as a part of the strategy that pertains to software and hardware resources that are made available to the computing device 102 via the Internet or other networks. For example, the navigation module 104 may be implemented in part on the computing device 102 as well as via platform 210 that supports web services 212.

The gesture techniques supported by the gesture module may be detected using touchscreen functionality in the mobile configuration 202, track pad functionality of the computer 204 configuration, detected by a camera as part of support of a natural user interface (NUI) that does not involve contact with a specific input device, and so on. Further, performance of the operations to detect and recognize the inputs to identify a particular gesture may be distributed throughout the system 200, such as by the computing device 102 and/or the web services 212 supported by the platform 210 of the cloud 208.

Generally, any of the functions described herein can be implemented using software, firmware, hardware (e.g., fixed logic circuitry), or a combination of these implementations. The terms "module," "functionality," and "logic" as used herein generally represent software, firmware, hardware, or a combination thereof. In the case of a software implementation, the module, functionality, or logic represents program code that performs specified tasks when executed on a processor (e.g., CPU or CPUs). The program code can be stored in one or more computer-readable memory devices. The features of the user interface techniques described below are platform-independent, meaning that the techniques may be implemented on a variety of commercial computing platforms having a variety of processors.

Having described an example environment, consider now the following discussion of various techniques for proactively delivering navigation options to a user's mobile device.

EXAMPLE EMBODIMENTS

Figure 3:
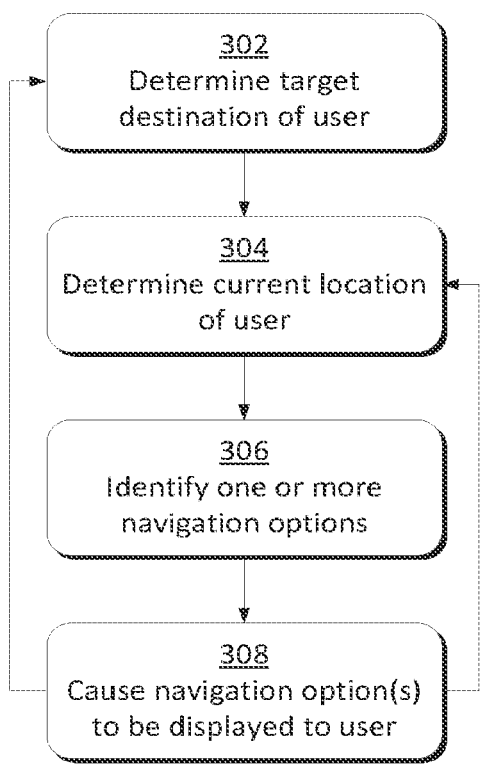
FIG. 3 is a block diagram illustrating an example method for proactively providing navigation options in accordance with one or more embodiments.

FIG. 3 is a diagram of an example process 300 for proactively providing navigation options to a user. The process can be implemented in connection with any suitable hardware, software, firmware, or combination thereof. In at least some embodiments, the process can be implemented in software. For example, the process can be implemented by navigation module 104.

Block 302 determines a target destination of a user. This can be performed in any suitable way. For example, navigation module 104 can receive information from another executable module on a user's mobile device, such as a calendar, indicating that a user has plans to be at a particular location for an event. Alternatively, navigation module 104 can presume, based on previously obtained information about a user (e.g., commonly visited locations or a navigation history indicating that a user travels to a particular location on a repeating basis, for example) that a user will be travelling to a particular destination. For example, navigation module 104 can build up a repository of places that the user frequently visits over time and can presume that a user is travelling to one of those locations. In various embodiments, one or more presumed target destinations can be presented to a user for selection, such as in a drop-down menu or a list. Target destination options can also be obtained based on recently input locations, locations saved in a "favorites" list, or the like. In embodiments in which a target destination is presumed, a user can confirm the destination as the target destination.

Block 304 determines a current location of the user. This can be performed in any suitable way. For example, the location of the user can be determined based on information obtained by a GPS sensor or another geo-location device. In some embodiments, the location can be determined using cellular tower triangulation methods or other locationing methods. In various embodiments, blocks 302 and 304 can be reversed.

Next, block 306 identifies one or more navigation options. This can be performed in any suitable way. For example, navigation module 104 can utilize map and route information, public transit information, user preferences, and other available information to compute one or more navigation options from the current location to the target destination. The number of navigation options can vary depending on the particular embodiment. For example, in some embodiments, the navigation module may have bus route and other mass transit information available while in other embodiments, the navigation module may have different information available to it. In various embodiments, a plurality of navigation options are identified that pertain to more than one mode of transportation. For example, a first navigation option may pertain to taking a bus, a second navigation option may involve a taxi, and a third navigation option can involve driving a vehicle. Other modes of transportation, such as walking, biking, or carpooling, in addition to other forms of mass transit, can also be included.

Block 308 causes the navigation option(s) to be displayed to the user. This can be performed in any suitable way. For example, the navigation module can cause the navigation options identified by block 306 to be displayed via a display on the user's mobile device. In various embodiments, multiple navigation options can be presented to a user for selection based on the user's preferences.

In various embodiments, the process can return to block 302 or block 304 and the list of navigation options can be updated according to a user's changed target destination or a user's change in current location. In some embodiments, other changes in circumstances can cause the list of navigation options to be updated. For example, the time of day can remove or add navigation options, such as when busses or public transportation stops running for the night or changes to "Express" rather than "Local". In various embodiments, information that has not been updated can be automatically populated for subsequent identification of navigation options. For example, when a user's current location has changed but the target destination remains the same, the target destination is automatically populated and the current location is updated according to the change. A subsequent list of navigation options can be identified and displayed to a user without the user requesting the subsequent list of navigation options.

To further illustrate the method, consider the following example. Assume that a user is out for the evening in Seattle. Also assume that the system is aware of the location of the user's home in Kirkland, a nearby city. For example, the user has saved the location as "home" or the system presumes that the location is the user's home based on the daily return of the user to the location.

At any point during the user's time in Seattle, the user can check the mobile device and view various navigation options that can be used to return home. For example, the user can be presented with information that a bus is leaving from the bus stop across the street in five minutes, and the bus stops right next to the user's house. Alternatively, a bus that will stop by the user's house also stops at an intersection three blocks away in twenty minutes, and a friend of the user is in a bar near the intersection. The user can also be presented with information that a group of the user's friends who live nearby to the user will be leaving a movie theater near the user's current location in a short period of time, suggesting that the user can ride with the friends. In various embodiments, the user can be presented with information that a cab from the user's current location to the user's home will cost approximately $50 and that the last bus leaving from the user's current location is in 45 minutes.

Assume now that, after viewing the navigation options provided, the user decides to visit another bar nearby rather than heading home. The user can request directions from the navigation module to the next location, or the user can simply move to the new location. As the user's navigation options change, such as based on the time, the navigation module can update the navigation options available to the user. For example, assume that the user's friends have left the movie theater and headed home. The navigation option that included riding home with the user's friends can be removed from the list of available options. Similarly, when one or more of the busses has stopped running for the evening, those options can also be removed from the list of available options that are displayed to the user. In some embodiments, additional navigation options may be added to the list. For example, another group of friends may have arrived at the bar that the user is at, and an option of sharing a ride with those friends can be added to the list.

In various embodiments, the navigation module can provide an alert to the user. The alert can be associated with one of the one or more navigation options and can indicate that the associated navigation option is approaching. For example, assume in the above example that the user has lost track of time, and the last bus going past the user's home is leaving in ten minutes. The navigation module can cause the mobile device to alert the user, such as through auditory, vibratory or visual means, that the user should be heading for the bus stop.

Now, assume that the user is attempting to catch the bus, but because the bartender was slow to run the user's tab, the user is going to miss the bus at the stop outside the bar. The navigation module can automatically provide an updated route to the user, indicating that the user should go one block north and catch the bus there rather than trying to catch the bus across the street from the bar because the bus route provides the user ample time to travel the block to get to the next stop before the bus. If the user misses the bus, the navigation module can provide alternative navigation options for the user to get home.

In various embodiments, in addition to storing information regarding locations a user frequents, the navigation module can also store information regarding locations a user would like to visit. For example, a user can create a list of places of interest and the navigation module can incorporate those places into navigation options to help the user explore these locations. Assume, for example, that the user has indicated an interest in visiting a new café. When the navigation module identifies one or more navigation options, it can also identify which navigation options can also enable the user to visit the café. For example, the user can be presented with the option to catch the bus at a particular intersection near the café, and can be informed that there is time for the user to stop in the café for ten minutes before the bus comes.

In various embodiments, navigation options can be displayed to a user in an animated way rather than as a list. For example, a bus can be depicted as travelling on a map with indications of where the bus stops (e.g., an "X" or star on the map). Similarly, when information from taxi companies is included, taxis can be depicted on the map where they are standing.

In various embodiments, user preferences can be saved and used to determine navigation options. For example, the user can indicate a preference toward using public transportation, taxis, walking, etc. In some embodiments, user preferences can further include options such as avoiding toll rolls or presenting less costly navigation options before those that cost more. The one or more navigation options can be displayed to the user according to a cost associated with each of the one or more navigation options (e.g., from low to high or from high to low).

In various embodiments, navigation options can be presented for a point in time in the future. For example, a user at a restaurant can determine that the last bus has already been missed, and the user would like to stay another forty-five minutes. Therefore, the user can indicate a change in the time, and navigation options that will be available at that future time can be presented to the user. In some embodiments, the user can also indicate that the navigation options should be determined based on a future location that the user will be at when the navigation options will be relevant (e.g., a future current location).

As discussed above, in various embodiments, the functionality of the navigation module can be implemented in part on the user's device as well as via a platform that supports web services. For example, information can be obtained by a navigation module component implemented on the user's device and transmitted to a navigation module component implemented as a web service. The web service can identify one or more navigation options according to the received information and transmit the options back to the user device to be displayed to the user. In some embodiments, information can be obtained by navigation module components on both the user device and the platform.

Example Device

Figure 4:
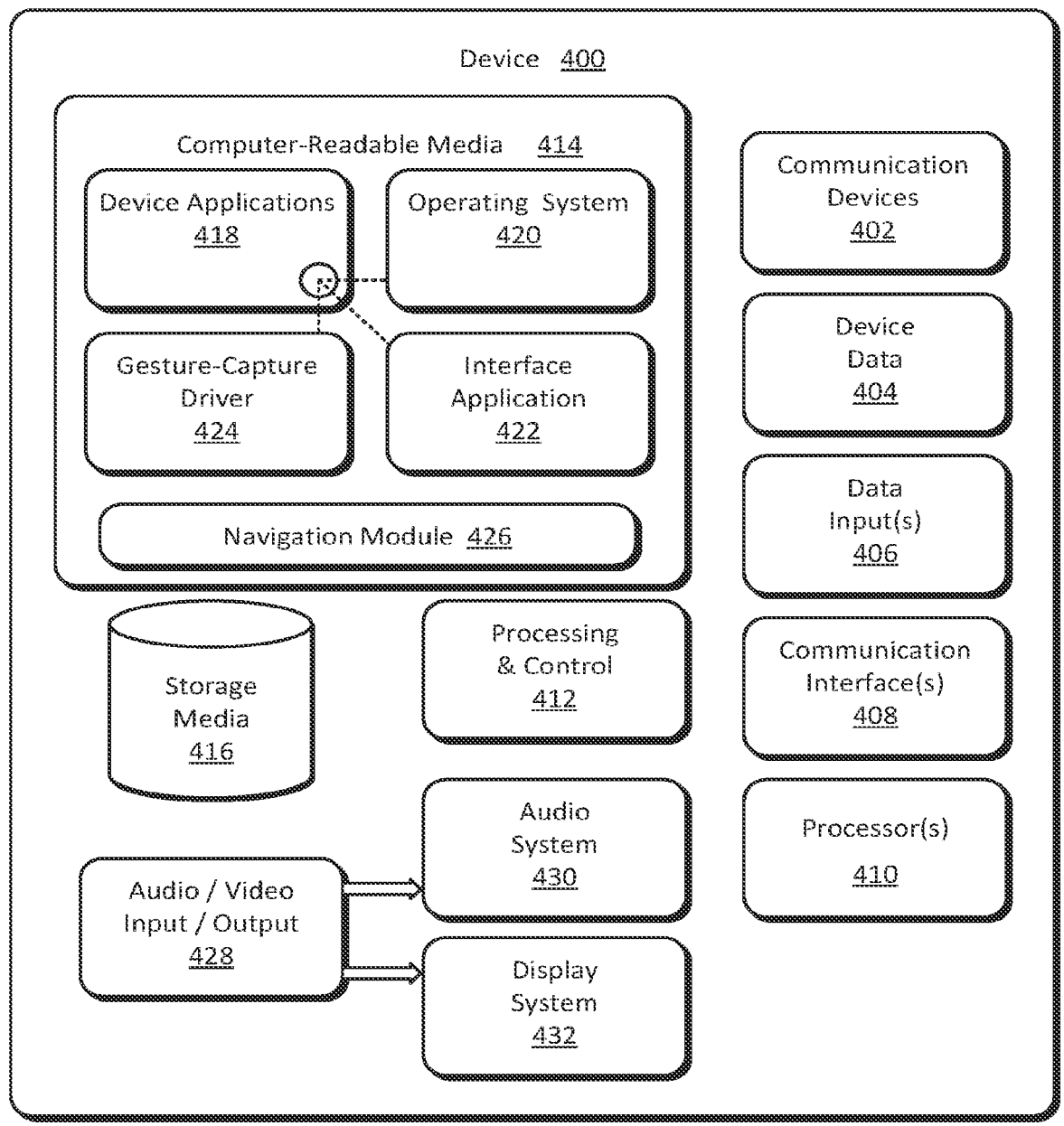
FIG. 4 illustrates an example computing device that can be utilized to implement various embodiments described herein.

FIG. 4 illustrates various components of an example device 400 that can be implemented as any type of portable and/or computer device as described with reference to FIGS. 1 and 2 to implement embodiments of the caching module described herein. Device 400 includes communication devices 402 that enable wired and/or wireless communication of device data 404 (e.g., received data, data that is being received, data scheduled for broadcast, data packets of the data, etc.). The device data 404 or other device content can include configuration settings of the device, media content stored on the device, and/or information associated with a user of the device. Media content stored on device 400 can include any type of audio, video, and/or image data. Device 400 includes one or more data inputs 406 via which any type of data, media content, and/or inputs can be received, such as user-selectable inputs, messages, music, television media content, recorded video content, and any other type of audio, video, and/or image data received from any content and/or data source.

Device 400 also includes communication interfaces 408 that can be implemented as any one or more of a serial and/or parallel interface, a wireless interface, any type of network interface, a modem, and as any other type of communication interface. The communication interfaces 408 provide a connection and/or communication links between device 400 and a communication network by which other electronic, computing, and communication devices communicate data with device 400.

Device 400 includes one or more processors 410 (e.g., any of microprocessors, controllers, and the like) which process various computer-executable or readable instructions to control the operation of device 400 and to implement the embodiments described above. Alternatively or in addition, device 400 can be implemented with any one or combination of hardware, firmware, or fixed logic circuitry that is implemented in connection with processing and control circuits which are generally identified at 412. Although not shown, device 400 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 400 also includes computer-readable media 414, such as one or more memory components, examples of which include random access memory (RAM), non-volatile memory (e.g., any one or more of a read-only memory (ROM), flash memory. EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 400 can also include a mass storage media device 416.

Computer-readable media 414 provides data storage mechanisms to store the device data 404, as well as various device applications 418 and any other types of information and/or data related to operational aspects of device 400. For example, an operating system 420 can be maintained as a computer application with the computer-readable media 414 and executed on processors 410. The device applications 418 can include a device manager (e.g., a control application, software application, signal processing and control module, code that is native to a particular device, a hardware abstraction layer for a particular device, etc.), as well as other applications that can include, web browsers, image processing applications, communication applications such as instant messaging applications, word processing applications and a variety of other different applications. The device applications 418 also include any system components or modules to implement embodiments of the techniques described herein. In this example, the device applications 418 include an interface application 422 and a gesture-capture driver 424 that are shown as software modules and/or computer applications. The gesture-capture driver 424 is representative of software that is used to provide an interface with a device configured to capture a gesture, such as a touchscreen, track pad, camera, and so on. Alternatively or in addition, the interface application 422 and the gesture-capture driver 424 can be implemented as hardware, software, firmware, or any combination thereof. In addition, computer-readable media 414 can include a navigation module 426 that functions as described above.

Device 400 also includes an audio and/or video input-output system 428 that provides audio data to an audio system 430 and/or provides video data to a display system 432. The audio system 430 and/or the display system 432 can include any devices that process, display, and/or otherwise render audio, video, and image data. Video signals and audio signals can be communicated from device 400 to an audio device and/or to a display device via an RF (radio frequency) link, S-video link, composite video link, component video link, DVI (digital video interface), analog audio connection, or other similar communication link. In an embodiment, the audio system 430 and/or the display system 432 are implemented as external components to device 400. Alternatively, the audio system 430 and/or the display system 432 are implemented as integrated components of example device 400.

While various embodiments have been described above, it should be understood that they have been presented by way of example, and not limitation. It will be apparent to persons skilled in the relevant art(s) that various changes in form and detail can be made therein without departing from the scope of the present disclosure. Thus, embodiments should not be limited by any of the above-described exemplary embodiments, but should be defined only in accordance with the following claims and their equivalents.

What is claimed is:

1. A computer-implemented method performed by a computer system having a memory and at least one hardware processor, the computer-implemented method comprising:
   receiving global positioning information of a mobile device of a user;
   determining a current location of the mobile device based on the global positioning information,
   identifying a public transit location for public transit navigation options based on the current location of the mobile device and a target destination, the public transit navigation options comprising using a public transit vehicle to travel from the public transit location to the target destination;
   determining that no more public transit navigation options will be available at the public transit location for a period of time after a particular time; and
   causing an alert to be presented on the mobile device of the user based on the determination that no more public transit navigation options will be available at the public transit location for the period of time after the particular time.

2. The computer-implemented method of claim 1, wherein the determining that no more public transit navigation options will be available at the public transit location for the period of time after the particular time is based on schedule information indicating that the public transit vehicle is scheduled to leave a scheduled location at the particular time.

3. The computer-implemented method of claim 1, wherein the determining that no more public transit navigation options will be available at the public transit location for the period of time after the particular time is based on schedule information indicating a time at which the public transit vehicle is scheduled to stop at a scheduled location.

4. The computer-implemented method of claim 1, wherein the alert comprises an auditory alert.

5. The computer-implemented method of claim 2, wherein the alert comprises a vibratory alert.

6. The computer-implemented method of claim 1, wherein the alert comprises a visual alert.

7. A system comprising:
one or more hardware processors; and
a memory storing instructions that, when executed by the one or more hardware processors, cause the one or more hardware processors to perform operations comprising:
receiving global positioning information of a mobile device of a user;
determining a current location of the mobile device based on the global positioning information;
identifying a public transit location for public transit navigation options based on the current location of the mobile device and a target destination, the public transit navigation options comprising using a public transit vehicle to travel from the public transit location to the target destination;
determining that no more public transit navigation options will be available at the public transit location for a period of time after a particular time; and
causing an alert to be presented on the mobile device of the user based on the determination that no more public transit navigation options will be available at the public transit location for the period of time after the particular time.

8. The system of claim 7, wherein the determining that no more public transit navigation options will be available at the public transit location for the period of time after the particular time is based on schedule information indicating that the public transit vehicle is scheduled to leave a scheduled location at the particular time.

9. The system of claim 7, wherein the determining that no more public transit navigation options will be available at the public transit location for the period of time after the particular time is based on schedule information indicating a time at which the public transit vehicle is scheduled to stop at a scheduled location.

10. The system of claim 7, wherein the alert comprises an auditory alert.

11. The system of claim 7, wherein the alert comprises a vibratory alert.

12. The system of claim 7, wherein the alert comprises a visual alert.

13. A non-transitory computer-readable medium comprising instructions stored thereon that are executable by at least one processor to cause a computing device to perform operations comprising:
receiving global positioning information of a mobile device of a user;
determining a current location of the mobile device based on the global positioning information;
identifying a public transit location for public transit navigation options based on the current location of the mobile device and a target destination, the public transit navigation options comprising using a public transit vehicle to travel from the public transit location to the target destination;
determining that no more public transit navigation options will be available at the public transit location for a period of time after a particular time; and
causing an alert to be presented on the mobile device of the user based on the determination that no more public transit navigation options will be available at the public transit location for the period of time after the particular time.

14. The non-transitory computer-readable medium of claim 13, wherein the determining that no more public transit navigation options will be available at the public transit location for the period of time after the particular time is based on schedule information indicating that the public transit vehicle is scheduled to leave a scheduled location at the particular time.

15. The non-transitory computer-readable medium of claim 13, wherein the determining that no more public transit navigation options will be available at the public transit location for the period of time after the particular time is based on schedule information indicating a time at which the public transit vehicle is scheduled to stop at a scheduled location.

16. The non-transitory computer-readable medium of claim 13, wherein the alert comprises an auditory alert.

17. The non-transitory computer-readable medium of claim 13, wherein the alert comprises a visual alert.

* * * * *

UNITED STATES PATENT AND TRADEMARK OFFICE
CERTIFICATE OF CORRECTION

PATENT NO. : 11,821,735 B2
APPLICATION NO. : 17/660539
DATED : November 21, 2023
INVENTOR(S) : Voronel et al.

It is certified that error appears in the above-identified patent and that said Letters Patent is hereby corrected as shown below:

In the Claims

In Column 10, Line 36, in Claim 1, delete "information," and insert --information;-- therefor In Column 10, Line 66, in Claim 5, delete "claim 2," and insert --claim 1,-- therefor Signed and Sealed this
Sixth Day of February, 2024

*Katherine Kelly Vidal*
Katherine Kelly Vidal
*Director of the United States Patent and Trademark Office*